United States Patent
Okazaki et al.

(10) Patent No.: US 7,107,819 B2
(45) Date of Patent: Sep. 19, 2006

(54) PRESSURE SENSOR UNIT HAVING A RING-LIKE PRESSURE SENSING ELEMENT

(75) Inventors: Koji Okazaki, Ichinomiya (JP); Masayoshi Matsui, Ichinomiya (JP); Keiichi Oozawa, Kakamigahara (JP); Takahiro Suzuki, Nagoya (JP)

(73) Assignee: NGK Spark Plug Co., Ltd., Aichi (JP)

(*) Notice: Subject to any disclaimer, the term of this patent is extended or adjusted under 35 U.S.C. 154(b) by 168 days.

(21) Appl. No.: 10/433,059

(22) PCT Filed: Nov. 27, 2001

(86) PCT No.: PCT/JP01/10337

§ 371 (c)(1),
(2), (4) Date: Nov. 10, 2003

(87) PCT Pub. No.: WO02/44681

PCT Pub. Date: Jun. 6, 2002

(65) Prior Publication Data

US 2004/0055388 A1 Mar. 25, 2004

(30) Foreign Application Priority Data

Nov. 30, 2000 (JP) ........................................ 2000-364941

(51) Int. Cl.
*G01L 7/00* (2006.01)

(52) U.S. Cl. ........................................ 73/35.12; 73/115
(58) Field of Classification Search ................ 73/35.01, 73/35.07, 35.12, 112, 115, 116, 117.2, 117.3, 73/118.1

See application file for complete search history.

(56) References Cited

U.S. PATENT DOCUMENTS

| | | | | |
|---|---|---|---|---|
| 4,898,024 A | * | 2/1990 | Takeuchi ...................... 73/115 |
| 5,313,849 A | * | 5/1994 | Miyata et al. .............. 73/866.5 |
| 5,323,643 A | * | 6/1994 | Kojima et al. ................. 73/115 |
| 5,479,817 A | * | 1/1996 | Suzuki et al. .................. 73/115 |
| 5,747,677 A | * | 5/1998 | Tomisawa et al. ............. 73/115 |
| 5,955,826 A | * | 9/1999 | Suzuki et al. ................ 313/119 |
| 6,119,667 A | * | 9/2000 | Boyer et al. ................. 123/634 |
| 6,134,947 A | * | 10/2000 | Kwun ........................ 73/35.12 |
| 6,559,577 B1 | * | 5/2003 | Okazaki et al. ............. 313/118 |
| 6,570,304 B1 | * | 5/2003 | Okazaki et al. ............. 313/118 |
| 6,776,032 B1 | * | 8/2004 | Matsui et al. ............... 73/117.3 |
| 2002/0047507 A1 | * | 4/2002 | Okazaki et al. ............. 313/141 |
| 2002/0121127 A1 | * | 9/2002 | Kiess et al. ................. 73/35.07 |

FOREIGN PATENT DOCUMENTS

| | | |
|---|---|---|
| EP | 0 510 515 A1 | 10/1992 |
| JP | 59-145941 | 8/1984 |
| JP | 6-281524 A | 10/1994 |
| JP | 7-063631 A | 3/1995 |
| JP | 2002-43023 A | 2/2002 |

* cited by examiner

*Primary Examiner*—Eric S. McCall
(74) *Attorney, Agent, or Firm*—Sughrue Mion, PLLC

(57) ABSTRACT

According to the present invention, there is provided a pressure sensor unit (1) having a ring-like pressure sensing element (3), which is formed separately from a spark plug, in the state where a spark plug (100) has been attached a rear end of at least one of an inner cylinder member (6) and an outer cylinder member (5) in the direction of an axis (O) is located between the rear end of the pressure sensing element (3) and the rear end of a insulator (110) of the spark plug (standard section (SS)), while at the rear of the standard section (SS), no component of the pressure sensor unit (1) exists in an area inside the inner circumferential surface of the outer cylinder member (5) or its extended plate (EP).

20 Claims, 13 Drawing Sheets

(a)

(b)

(c)

PRESSURE SENSOR UNIT HAVING A RING-LIKE PRESSURE SENSING ELEMENT

TECHNICAL FIELD

The present invention relates to a pressure sensor unit.

BACKGROUND ART

For the purposes of detection of combustion conditions or knocking, improvement of fuel economy, cleaning of exhaust gas, and so on, in an internal combustion engine, the pressure in a combustion chamber of the internal combustion engine has been heretofore detected by a pressure sensor built in a spark plug. The pressure sensor integrated spark plug used for such purposes will be summarized below. That is, a pressure sensing element constituted by a ring-like piezo ceramic element is fitted, together with a ring-like electrode for extracting an output, from outside into a base end position of an attaching screw portion formed in a metal shell of a spark plug. The pressure sensing element is caught by a collar-like sensor retention portion while the pressure sensing element as a whole is covered with a sensor housing from the outside. An output lead wire from the ring-like electrode is extracted rearward from the sensor housing. When the spark plug is attached to a plug hole of an internal combustion engine at the attaching screw portion, the pressure sensor is pressed onto an opening outer edge portion of the plug hole through the sensor housing. The combustion pressure is transmitted to the pressure sensor through the sensor housing. The pressure sensor outputs a voltage proportional to a detected pressure level through the output lead wire by the piezo-electric effect.

However, in the case of the structure in which the pressure sensing element has been built in the spark plug integrally and inseparably as described above, once the life time of the spark plug is expired, the pressure sensor portion together with the spark plug has to be wastefully exchanged for a new one even if the pressure sensor portion is in a working condition. Therefore, Japanese Patent Laid-Open No. 290853/1994 (FIGS. 7 and 8) discloses a configuration in which a pressure sensor is formed separately from a spark plug so that the pressure sensor can be attached to a newly exchanged spark plug and used continuously.

However, the pressure sensor configured thus has a structure in which a lead wire for extracting a sensor output projects sideways from the pressure sensing element and then led out on the rear end side of the spark plug. In such a structure, the pressure sensor is difficult to apply to recent engines in which space saving has been advanced. For example, in recent automobile gasoline engines, a mechanism in the periphery of a cylinder head to which a spark plug is attached is sophisticated. Particularly, in a structure in which a spark plug is attached to the bottom portion of a deep plug hole formed in a cylinder head, valve-system components and so on crowded around the plug hole bottom where a pressure sensing element is located. Thus, in not a few engines, no allowance is left for projecting the lead wire sideways. In addition, the lead wire extracted rearward occupies a certain space in the plug hole. However, in order to save the space in the engine room, there is a type in which a pencil-like ignition coil is installed in the plug hole. In this case, there may occur a problem that the lead wire becomes an obstacle to the installation of the ignition coil.

DISCLOSURE OF THE INVENTION

An object of the present invention is to provide a pressure sensor unit which is formed separately from a spark plug, and in which an extra space does not have to be secured in the peripheral portion of a pressure sensing element, and a space for attaching peripheral components such as an ignition coil and the like can be secured flexibly in a spark plug hole.

In order to solve the foregoing problems, the pressure sensor unit according to the present invention has the following configuration as first and second configurations. That is, a cylindrical unit body portion in which a spark plug insertion hole has been formed in the bottom surface is provided, and a ring-like pressure sensing element is incorporated in the cylindrical unit body portion so as to surround the spark plug insertion hole. Then, when the side on which the pressure sensing element is located is set as the front end side in the axial direction, the unit body portion is inserted and fixed axially into the plug hole from the front end side. Then, the spark plug is inserted into the spark plug insertion hole in that state, and attached to an attachment hole in the plug hole bottom. Thus, the pressure sensing element is nipped and retained between a sensor support portion projecting like a collar from the outer circumferential surface of a metal shell of the spark plug, and an opening circumferential edge portion of the attachment hole. That is, the unit body portion is formed separately from the spark plug so that, for example, only the spark plug can be exchanged for a new one while the unit body portion is left in the plug hole.

Next, the unit body portion is specifically configured as follows. That is, the unit body portion has an outer cylinder member forming the outer circumferential surface portion and an inner cylinder member forming the inner circumferential surface portion likewise, and the pressure sensing element is disposed in a clearance formed between the outer cylinder member and the inner cylinder member. In addition, the output from the pressure sensing element is extracted by a sensor output lead wire via a sensor output terminal led out into the clearance. That is, the ring-like pressure sensing element is disposed between these two cylindrical members, and a terminal for extracting the output is led out into the clearance between the cylindrical members. Due to such a structure, the terminal and the sensor output lead wire connected to the terminal are prevented from projecting radially outward from the pressure sensing element, that is, sideways. Accordingly, it becomes unnecessary to secure an extra space in the peripheral portion of the pressure sensing element in the plug hole. Thus, easy attachment, for example, to a cylinder head in which valve-system components and so on crowded around the plug hole bottom can be achieved. The description made so far is common in both the first and second configurations.

Then, in the first configuration, in the state where the aforementioned spark plug has been attached, the axially rear end of at least one of the inner cylinder member and the outer cylinder member is designed to be located between the rear end of the pressure sensing element and the rear end of an insulator of the spark plug (in a standard section). In addition, at the rear of the standard section, no component of the pressure sensor unit is designed to be located in the area inside the inner circumferential surface of the outer cylinder member or its extended plane. Accordingly, at the rear of the standard section in the plug hole, a space for attaching an ignition coil and so on can be secured up to the whole dimensions of the inner circumferential surface of the outer cylinder member.

On the other hand, in the second configuration, in the state where the spark plug has been attached, the axially rear end of at least one of the inner cylinder member and the outer cylinder member is designed to be located between the rear end of the pressure sensing element and the rear end of an insulator of the spark plug (in a standard section). In addition, at the rear of the standard section, the radially outer edge position of the sensor output lead wire with respect to its axis is designed to be located outside the inner circumferential surface position of the outer cylinder body portion. That is, at the rear of the standard section, the sensor output lead wire is, so to speak, offset by a space, in a radial direction, outside the spatial area surrounded by the inner circumferential surface of the outer cylinder member and its extended plane. Accordingly, a space for attaching an ignition coil and so on can be secured easily in the space in the plug hole.

Incidentally, the reference numerals and signs given to the respective requirements in Claims of this specification are used with the aid of the reference numerals and signs given to the corresponding parts in the accompanying drawings. However, those reference numerals and signs are provided not to place any restriction on the concepts of the respective constituent requirements in Claims but to facilitate understanding of the invention.

BEST MODE FOR CARRYING OUT THE INVENTION

Some embodiments of the present invention will be described below with reference to the drawings.

Figure 1:
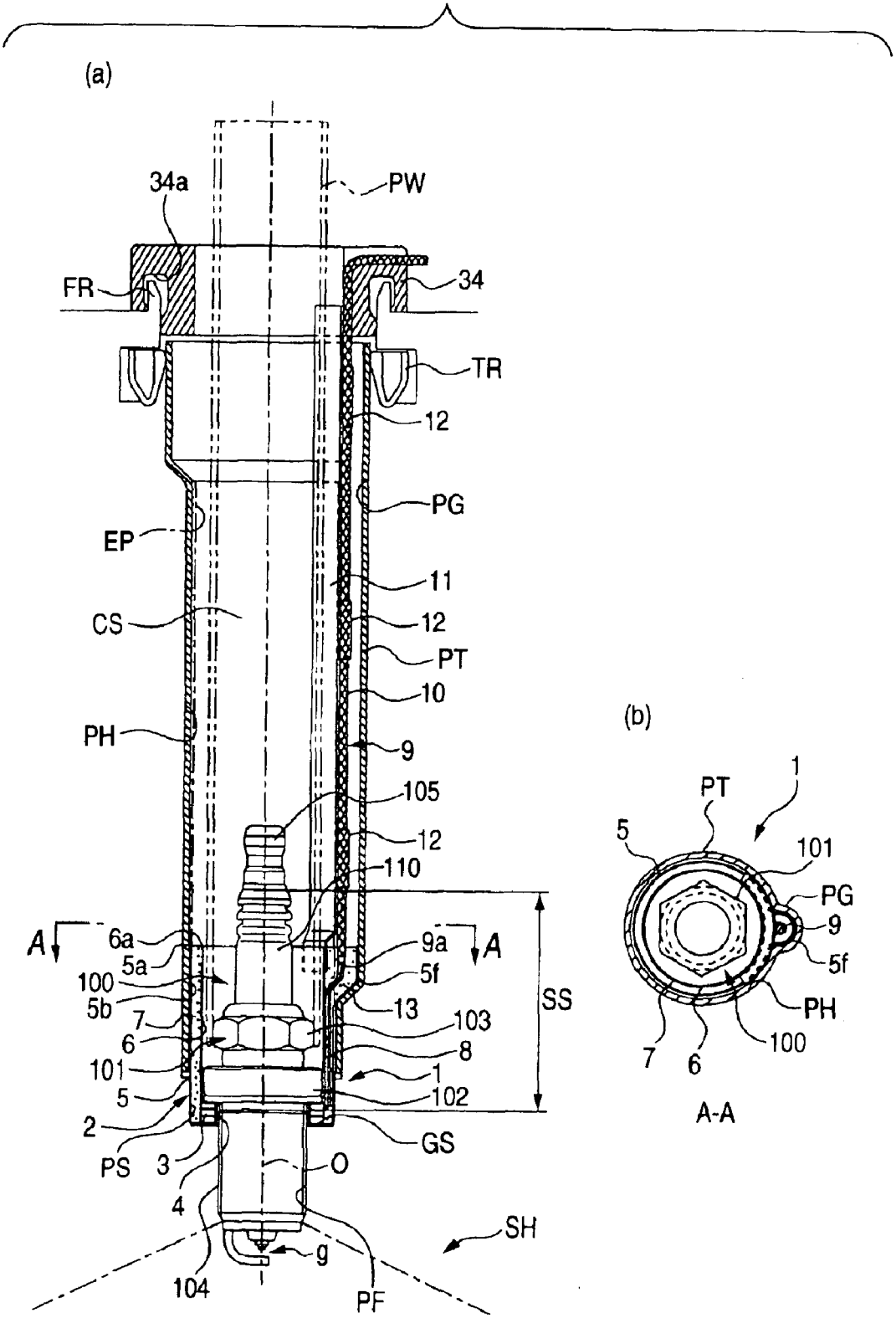
FIG. 1 is a longitudinal sectional view showing a first embodiment of a pressure sensor unit according to the present invention in the state where a spark plug has been attached, and a sectional view taken on line A—A of the longitudinal sectional view.

(a) of FIG. 1 is a sectional view showing a pressure sensor unit 1 according to an embodiment of the present invention in the state where it has been attached to a cylinder head SH. The pressure sensor unit 1 has a cylindrical unit body portion 2 in which a spark plug insertion hole 4 has been formed in the bottom surface. A ring-like pressure sensing element 3 is incorporated in the unit body portion 2 so as to surround the spark plug insertion hole 4. As shown in (a) of FIG. 1, when the side where the pressure sensing element 3 is located is set as the front end side in the direction of the axis O of the unit body portion 2, the unit body portion 2 is inserted and fixed into a plug hole PH from the front end side.

Figure 2:
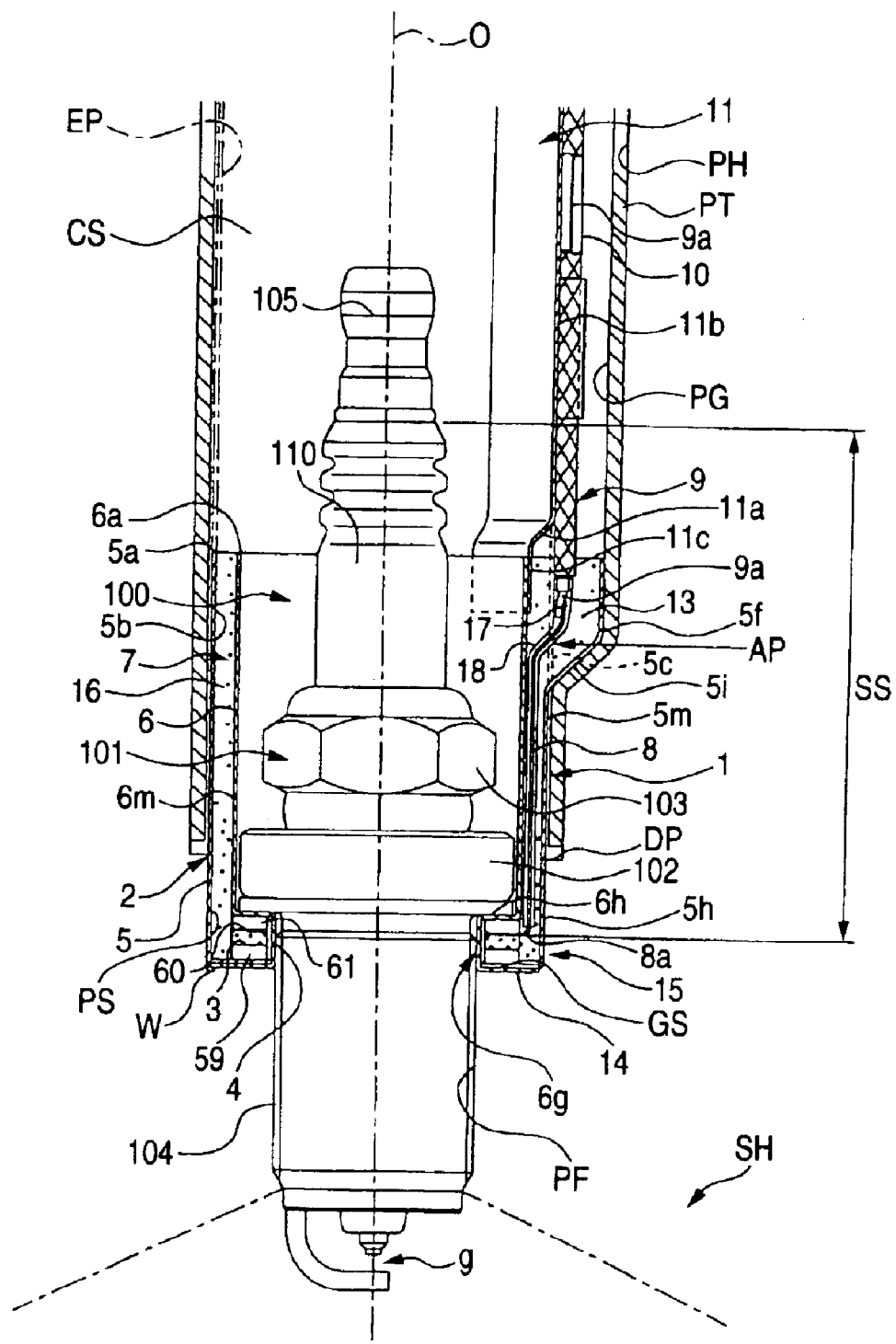
FIG. 2 is a main portion enlarged sectional view of FIG. 1.

As shown in FIG. 2, the inner surface of the plug hole PH is formed as a reduced-diameter portion PS by slightly reducing the diameter of the bottom portion due to a step portion DP. In the pressure sensor unit 1, the lower end portion of the unit body portion 2 is inserted into the reduced-diameter portion PS in the form of loose-fit. An attachment hole PF of a spark plug 100 is formed in the bottom surface of the plug hole in the form of a female tapped hole. Then, as shown in FIG. 2, the outer circumferential edge portion of the bottom surface of the unit body portion 2 tightly contacts with an opening circumferential edge portion GS of the attachment hole PF while the spark plug insertion hole 4 is aligned coaxially with the attachment hole PF. Incidentally, a plug tube PT for oil seal is pressed into the plug hole PH so as to cover the inner circumferential surface of the plug hole PH other than the reduced-diameter portion PS. As shown in FIG. 1, the plug tube PT tightly contacts with the inner surface of the plug hole PH in the form of tight fit so that oil seal is provided. Incidentally, an oil sealing TR for the plug tube PT is fitted to the upper end portion of the inner surface of the plug hole PH.

In the aforementioned state, the spark plug 100 is inserted into the spark plug insertion hole 4, and an attaching screw portion 104 formed on the front end side of the outer circumferential surface of a metal shell 1 is attached to the attachment hole PF in the form of screwing. Thus, the pressure sensing element 3 incorporated in the unit body portion 2 is nipped and retained between a sensor support portion 102 projecting like a collar from the outer circumferential surface of the metal shell 101 of the spark plug 100, and the opening circumferential edge portion GS of the attachment hole PF.

The unit body portion 2 has an outer cylinder member 5 forming the outer circumferential surface portion and an inner cylinder member 6 forming the inner circumferential surface portion likewise. The pressure sensing element 3 is disposed in a clearance 7 formed between the outer cylinder member 5 and the inner cylinder member 6. Then, the output from the pressure sensing element 3 is extracted by a sensor output lead wire 9 via a sensor output terminal 8 led out into the clearance 7. The sensor output lead wire 9 is constituted by a core wire 9a and a shield coat 10 covering the exterior of the core wire 9a. As shown in (a) of FIG. 1, at least one rear end of the inner cylinder member 6 and the outer cylinder member 5, on this occasion, rear ends 6a and 5a of both the inner cylinder member 6 and the outer cylinder member 5 in the direction of the axis O are located between the rear end of the pressure sensing element 3 and the rear end of an insulator 110 of the spark plug 100 (in a standard section SS). Then, at the rear of the standard section, no component of the pressure sensor unit 1 is designed to be located in the area inside an inner circumferential surface 5b of the outer cylinder member 5 or an extended plane EP thereof. In addition, at the rear of the standard section SS, the radially outer edge position of the sensor output lead wire 9 with respect to the axis O is located outside the inner circumferential surface position of an outer cylinder body portion 5m.

As shown in FIG. 2, the inner cylinder member 6 has a bulge portion 6g in which the end portion wall on the front end side in the direction of the axis O is bulged to the radial inside, and the inner circumferential surface of the bulge portion 6g is formed as the spark plug insertion hole 4. In addition, the outer cylinder member 5 and the bulge portion 6g of the inner cylinder member 6 are integrated with each other through a bottom closing portion 14 which closes the clearance 7 on the front end side in the direction of the axis O. Then, the bulge portion 6g, a wall portion 5h of the outer cylinder member 5 opposite to the bulge portion 6g, and the bottom closing portion 14 form a sensor receiving portion 15 for receiving the pressure sensing element 3. When the bulge portion 6g of the inner cylinder member 6 is provided thus so that the pressure sensing element 3 is received here, the pressure sensing element 3 is surely nipped between the sensor support portion 102 and the opening circumferential edge portion GS of the attachment hole PF together with the sensor receiving portion 15 in the state where the spark plug 100 has been attached as shown in (a) of FIG. 1. As a result, pressure information from the cylinder head SH side can be detected surely.

Then, as shown in FIG. 2, a ring-like electrode plate 60 is laminated onto the ring-like pressure sensing element 3 in the sensor receiving portion 15. Then, at least a portion of the electrode plate 60 which forms the inner circumferential edge side thereof is received in the bulge portion 6g of the inner cylinder member 6. On the other hand, the sensor output terminal 8 is formed so that a base end portion 8a is integrated with the outer circumferential edge of the electrode plate 60, while a tail end side portion 8b extends into a space of the clearance 7 which is located at the rear of the bulge portion 6g in the direction of the axis O. By such a structure, the sensor output terminal 8 and, accordingly, the sensor output lead wire 9 connected thereto form no portion projecting radially outward in the position of the pressure sensing element 3. Thus, it is possible to flexibly cope with the case where valve-system components and so on crowded in the periphery of the bottom portion (reduced-diameter portion PS) of the plug hole PH so that it is difficult to secure an attachment space on the cylinder head side.

Figure 8:
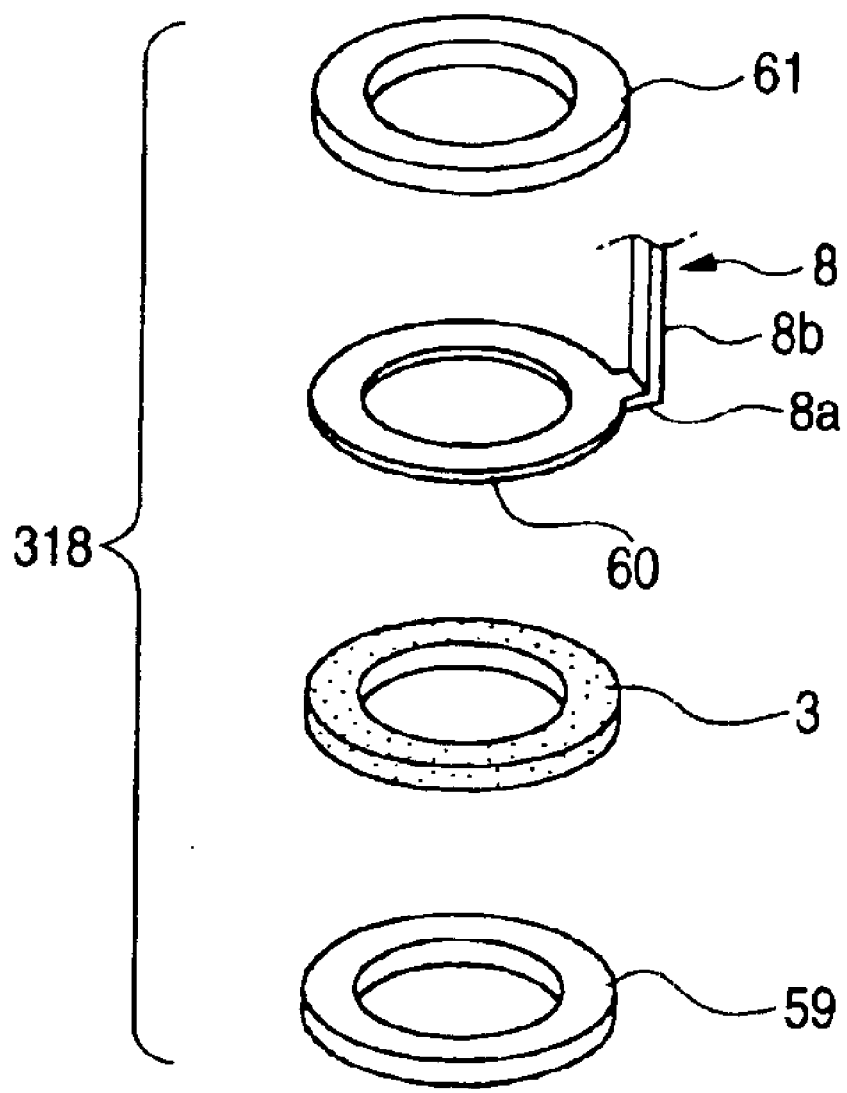
FIG. 8 is an exploded perspective view of a pressure sensor assembly.

The pressure sensing element 3 is received in the sensor receiving portion 15 so as to form a pressure sensor assembly 318 as shown in FIG. 8. The pressure sensor assembly 318 has a structure in which a ring-like sheet packing 59, the ring-like piezo ceramic element 3, the ring-like electrode plate 60, and a ring-like insulating plate 61 have been laminated in the order of increasing distance from the bottom closing portion 14. Such a structure can be manufactured easily in the steps, for example, shown in FIG. 9. First, as shown in (a) of FIG. 9, a member having a structure in which a body portion 6m and a reduced-diameter portion 6s have been connected through a step portion 6h is prepared as the inner cylinder member 6. Then, the insulating plate 61, the electrode plate 60, the piezo ceramic element 3 and the sheet packing 59 are fitted sequentially to the reduced-diameter portion 6s so that the pressure sensor assembly 318 is built on the step portion 6h. At this time, as shown in (b) of FIG. 9, the electrode terminal portion 8 integrated with the outer circumferential edge of the electrode plate 60 is bent downward (that is, toward the rear side in the direction of the axis O in FIG. 2) so as to be kept along the outer circumferential surface of the body portion 6m. Incidentally, an insulating coat 18 composed of a polytetrafluoroethylene tube or the like is attached to the electrode terminal portion 8 in advance. In addition, in the outer circumferential surface of the reduced-diameter portion 6s, at least the area opposite to the inner circumferential surface of the pressure sensor assembly 318 is covered with an insulating coat 418 composed of a polytetrafluoroethylene tube or the like.

Figure 9:
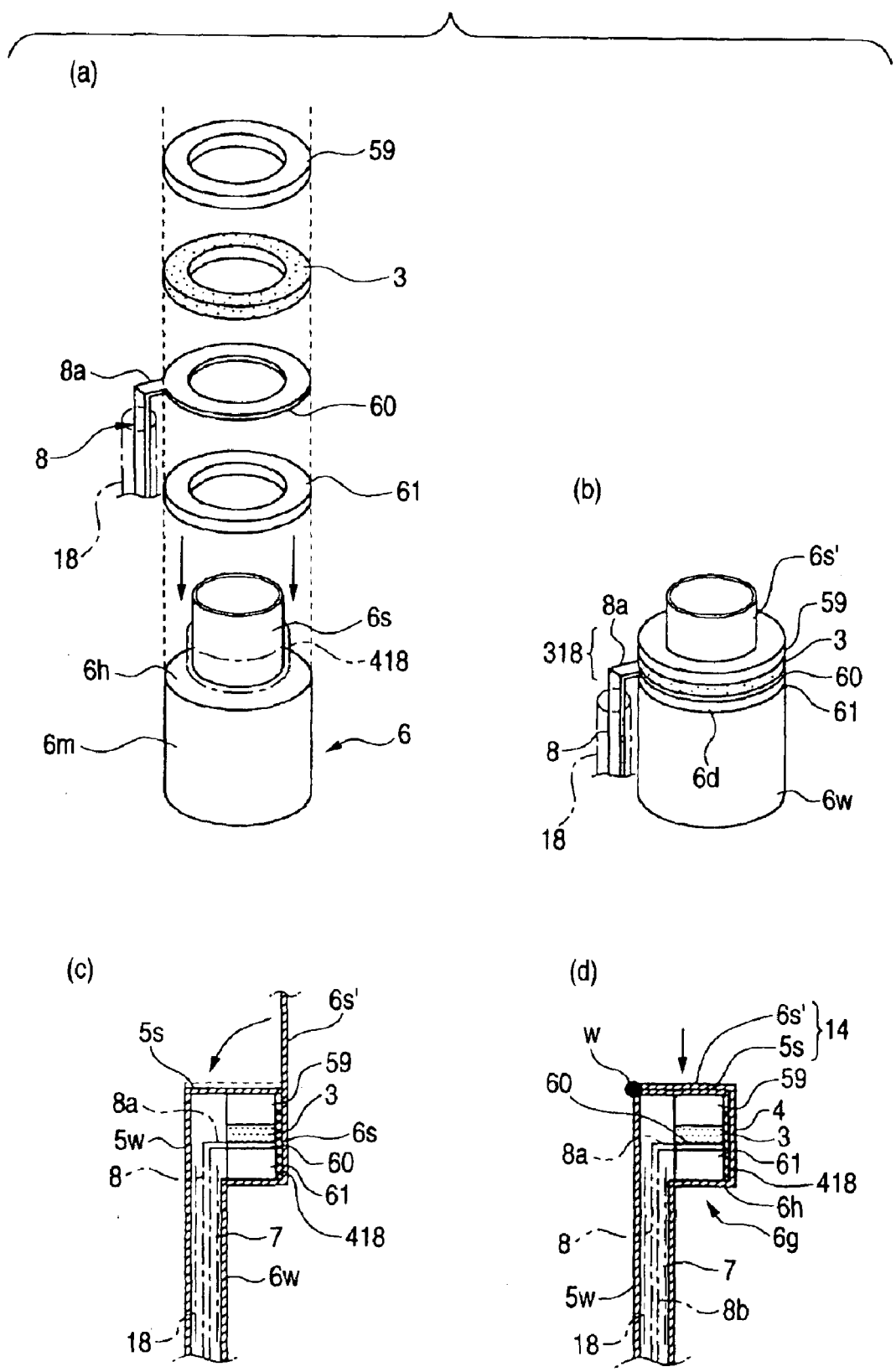
FIG. 9 is an explanatory view showing an example of the steps of assembling a unit body portion.

Next, as shown in (c) of FIG. 9, a circumferential overhang portion 5s is beforehand formed at the inner circumferential edge of the end surface of the body portion 5m formed cylindrically in the outer cylinder member 5. A front end portion 6s' of the reduced-diameter portion 6s of the inner cylinder member 6 projecting from the pressure sensor assembly 318 is inserted into the inside of the overhang portion 5s while the body portion 6m of the inner cylinder member 6 is covered with the body portion 5m. Thus, the overhang portion 5s covers the upper surface side of the pressure sensor assembly 318 while the clearance 7 is formed between the body portion 5m and the body portion 6m of the inner cylinder member 6. At this time, since the electrode terminal portion 8 is bent downward in advance, the electrode terminal portion 8 is automatically located in the clearance 7 as the outer cylinder member 5 is put on the electrode terminal portion 8. Then, the front end portion 6s' of the reduced-diameter portion 6s of the inner cylinder member 6 is clinched toward the overhang portion 5s. When this clinching is carried out with appropriate pressure, the tight contact of the step portion 6h and the clinched front end portion 6s' with the pressure sensor assembly 318 is improved.

Lastly, as shown in (d) of FIG. 9, the front end portion 6s' and the overhang portion 5s are welded through a circumferential welding portion W (e.g. laser welding portion) so that the outer cylinder member 5 and the inner cylinder member 6 are coupled in an air tight condition. As is apparent from the drawing, the front end portion 6s' and the overhang portion 5s form the bottom closing portion 14.

Return to FIG. 2. The clearance 7 between the inner cylinder member 6 and the outer cylinder member 5 is filled up with a polymeric material (e.g. silicon rubber) for insulating, so that the inside of the clearance 7 is formed as a polymeric material filled-up portion 16. Then, the sensor output terminal 8 and a wire connection portion 17 between the sensor output terminal 8 and the sensor output lead wire 9 are embedded in the polymeric material filled-up portion 16 in the state where they are covered with the insulating coat 18. Thus, the insulation of the sensor output terminal 8 and the sensor output lead wire 9 from the inner cylinder member 6 or the outer cylinder member 5 is secured well. In addition, since the wire connection portion 17 weak in strength is buried in the polymeric material filled-up portion, it becomes hard to produce problems such as disconnection, contact failure or the like due to the application of external force or the like.

Next, the sensor output lead wire 9 connected to the sensor output terminal 8 is passed between the inner circumferential surface of the outer cylinder body portion 5m and the outer circumferential surface of the body portion 6m of the inner cylinder member 6 in the section between the rear end surface of the pressure sensing element 3 and an extraction position AP (in the standard section SS, set on the front side of a standard position (here, on the front side of the rear end 6*a* of the inner cylinder member 6) which is either the rear end 6*a* of the inner cylinder member 6 or the rear end 5*a* of the outer cylinder member 5 and which is defined as the rearmost position in the direction of the axis O in the standard section SS) at a predetermined distance on the rear side in the direction of the axis O from the rear end surface of the pressure sensing element 3. Then, in the section behind the extraction position AP, the sensor output lead wire 9 is extracted outside the outer circumferential surface 5*c* of the outer cylinder body portion 5*m*. Consequently, as shown in (a) of FIG. 1, at the rear of the standard section SS, the sensor output lead wire 9 is excluded from the area inside the inner circumferential surface (or its extension EP) of the outer cylinder member 6 so that it becomes easy to secure a space for disposing an ignition coil or the like, which will be described later. Incidentally, the sensor output lead wire 9 extracted outside is passed into a groove portion PG (a groove portion is formed in a corresponding position also on the plug hole PH side) in the direction of the axis in which the circumferential wall of the plug tube PT has been bulged outward in a part of its circumferential section, as shown in (b) of FIG. 1.

In this embodiment, as shown in FIG. 2, a lead wire extracting portion 5*f* which bulges outward from the outer circumferential surface 5*c* of the outer cylinder body portion 5*m* is formed in the outer cylinder member 5 in the extraction position AP. According to this structure, the path change portion between the sensor output terminal 8 and the sensor output lead wire 9, which goes from the internal area of the body portion 5*m* of the outer cylinder member 5 toward the exterior area of the same, is received and protected in the lead wire extracting portion 5*f*. Thus, it becomes hard to produce such a problem that the path change portion is damaged due to impact or the like when the unit body portion 2 is attached into the plug hole PH. Incidentally, the lead wire extracting portion 5*f* is received in the front end portion of the groove portion PG. In this embodiment, the front end surface of the lead wire extracting portion 5*f* (and the corresponding rear end surface of the groove portion PG) is formed as an inclined surface 5*i*. Incidentally, the inside of the lead wire extracting portion 5*f* is formed as a polymeric material filled-up portion 13.

Next, as shown in (a) of FIG. 1, the sensor output lead wire 9 extends toward the rear behind the standard position 6*a* in the direction of the axis O, and a lead wire support portion 11 for supporting the sensor output lead wire 9 is provided integrally with the unit body 2 for the sake of convenience when the unit body portion 2 is attached into the plug hole. In this embodiment, the lead wire support portion 11 has a sheet-like member disposed along the sensor output lead wire 9. By use of such a sheet-like member, the lead wire support portion 11 can be formed to be lightweight and compact.

Figure 3:
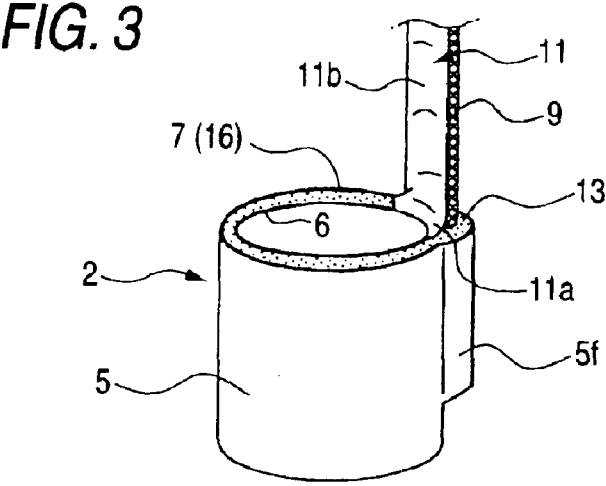
FIG. 3 is an external perspective view of a unit body portion.
Figure 4:
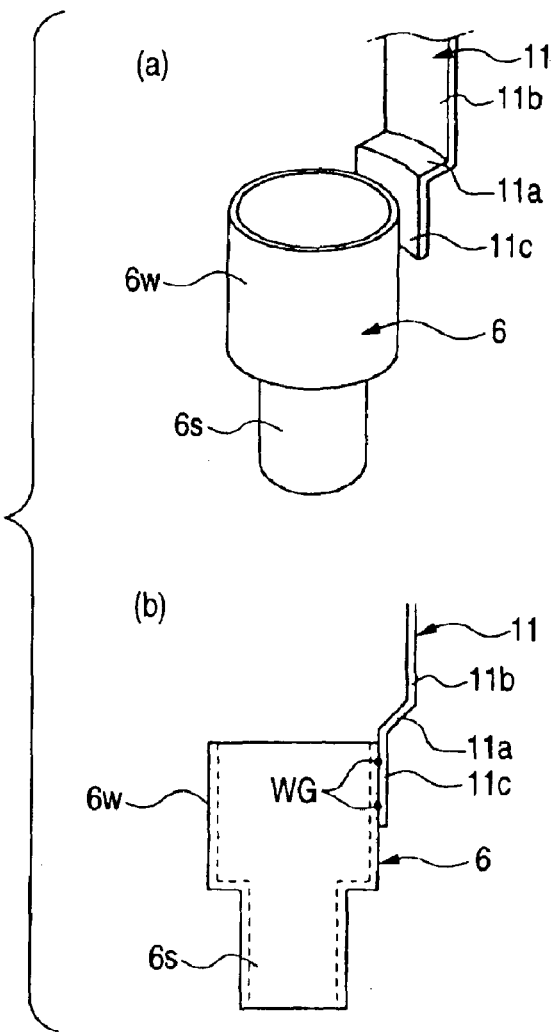
FIG. 4 is an explanatory view showing an example of the steps of attaching a lead wire support portion to an inner cylinder member.

The front end portion of the sheet-like member may be coupled with either the inner cylinder member 6 and the outer cylinder member (FIG. 2). However, the sheet-like member has to be located outside the inner circumferential surface (or its extension) of the body portion 5*m* of the outer cylinder member 5. Accordingly, when the front end portion of the sheet-like member is connected to the outer cylinder member 5, a hole or a notch has to be formed in order to avoid interference with the sensor output lead wire 9 extracted rearward from the clearance 7 between the inner cylinder member 6 and the outer cylinder member 5. Therefore, in this embodiment, as shown in FIG. 3, the front end portion of the sheet-like member is coupled with the rear end portion of the inner cylinder member 6, and designed to have a transit portion 11*a* extending toward an extended position of the wall portion of the outer cylinder member 5, and a main portion 11*b* following the transit portion 11*a* and extending rearward in the direction of the axis O. Thus, the interference with the sensor output lead wire 9 is avoided rationally. For example, such a structure can be obtained easily by forming a connection portion 11*c* on the further front end side of the transit portion 11*a*, as shown in (a) of FIG. 4, and coupling of the connection portion 11*c* to the outer circumferential surface of the body portion 6*m* of the inner cylinder member 6 through a welding portion WG or the like, as shown in (b) of FIG. 4.

Figure 6:
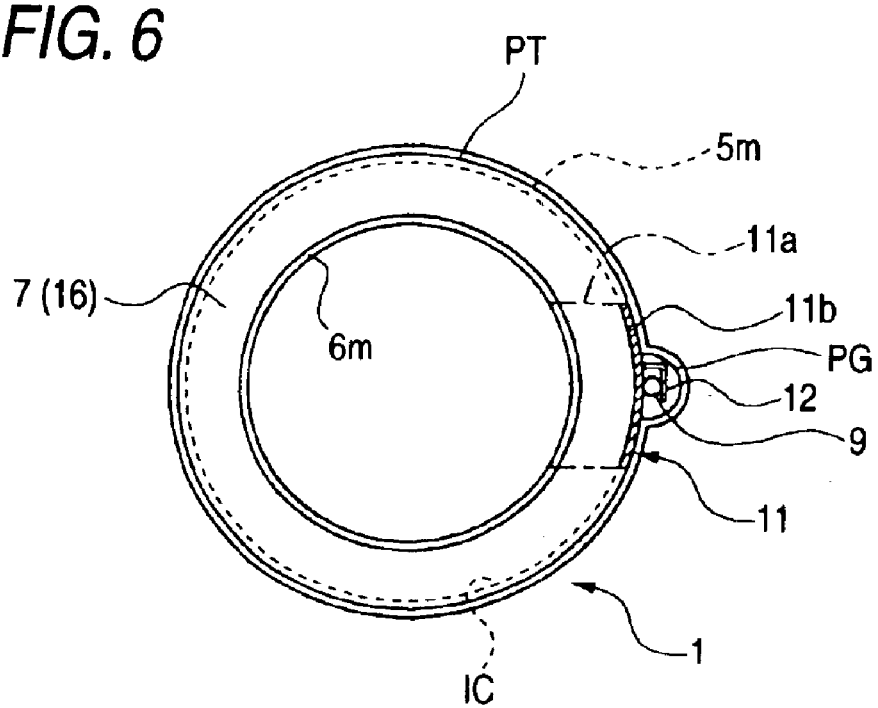
FIG. 6 is an axially sectional view showing an embodiment in which the lead wire support portion is not received in a plug-tube-side groove portion.
Figure 7:
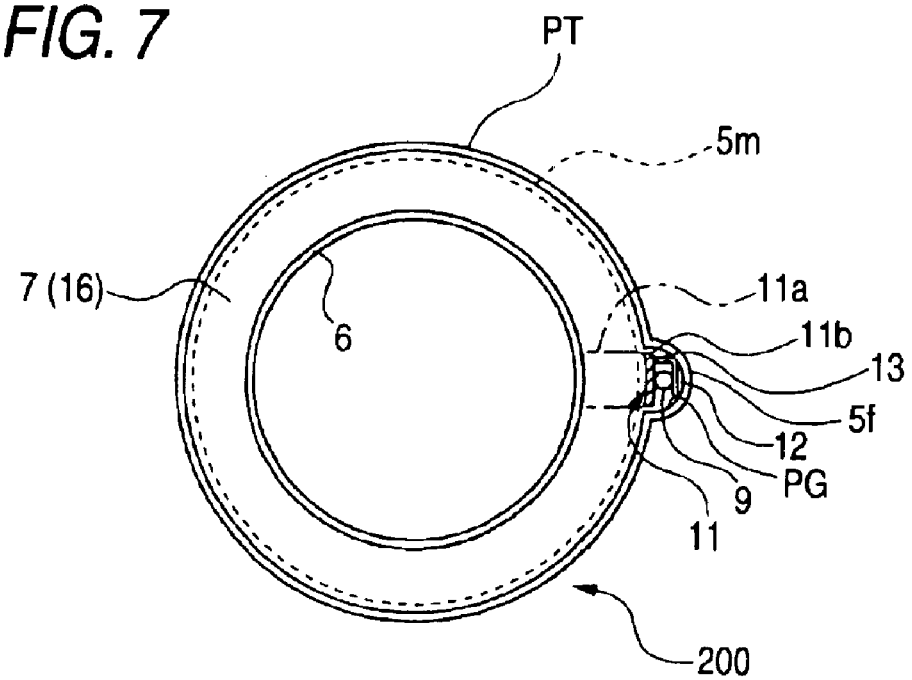
FIG. 7 is an axially sectional view showing an embodiment in which the lead wire support portion is received in the plug-tube-side groove portion.

In this embodiment, as shown in FIG. 6, the main portion 11*b* (sheet-like member) is disposed in a position which is radially inward from the groove portion PG, and the main portion 11*b* is made to be wider than the opening width of the groove portion PG in order to improve the strength. As a result, the space in the plug tube PT is used correspondingly to the thickness of the main portion 11*b*. In this embodiment, the main portion 11*b* is designed to have an arcuate section along the circumference of the outer cylinder member 5, so as to be devised not to produce any dead space in the plug tube PT as best as possible. On the other hand, if there is no problem on the strength of the main portion 11*b*, the main portion 11*b* narrower than the aforementioned one maybe disposed in the groove portion PG as shown in a pressure sensor unit 200 of FIG. 7.

Figure 5:
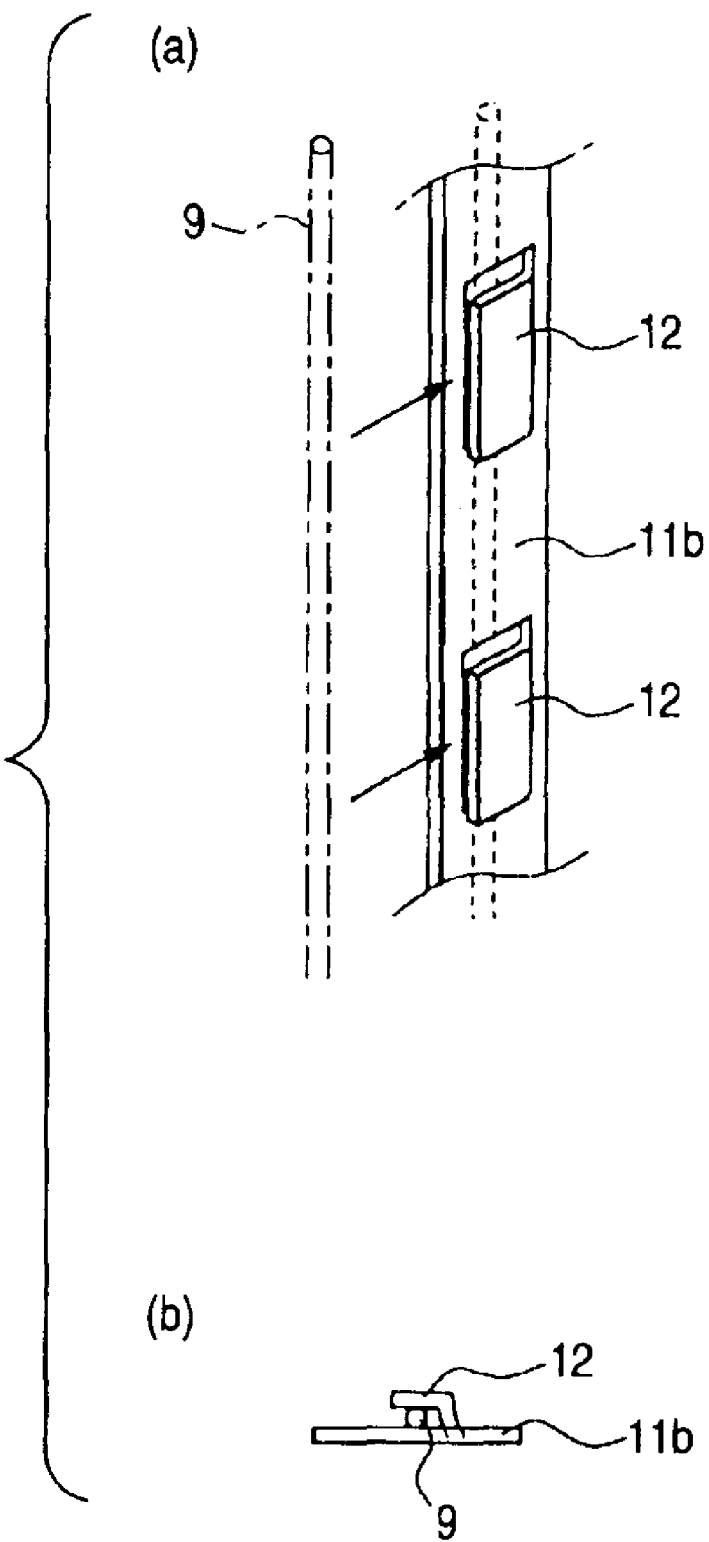
FIG. 5 is a perspective view showing an example of the formation of fixation portions in the lead wire support portion.

Return to FIG. 1. In the lead wire support portion 11, fixation portions 12 for fixing the sensor output lead wire 9 to the lead wire support portion 11 are provided at predetermined intervals in the direction of the axis O. When such fixation portions 12 are provided, such a problem that the lead wire support portion 11 is bent out into the plug hole can be prevented effectively. When the fixation portions 12 are formed as cut-and-raised portions formed in a sheet material forming the support surface of the lead wire support portion 11, for example, as shown in FIG. 5, the fixation portions 12 are simple in structure and easy to form. In this case, the sensor output lead wire 9 is inserted into and retained in the inside of the cut-and-raised portions.

Figure 10:
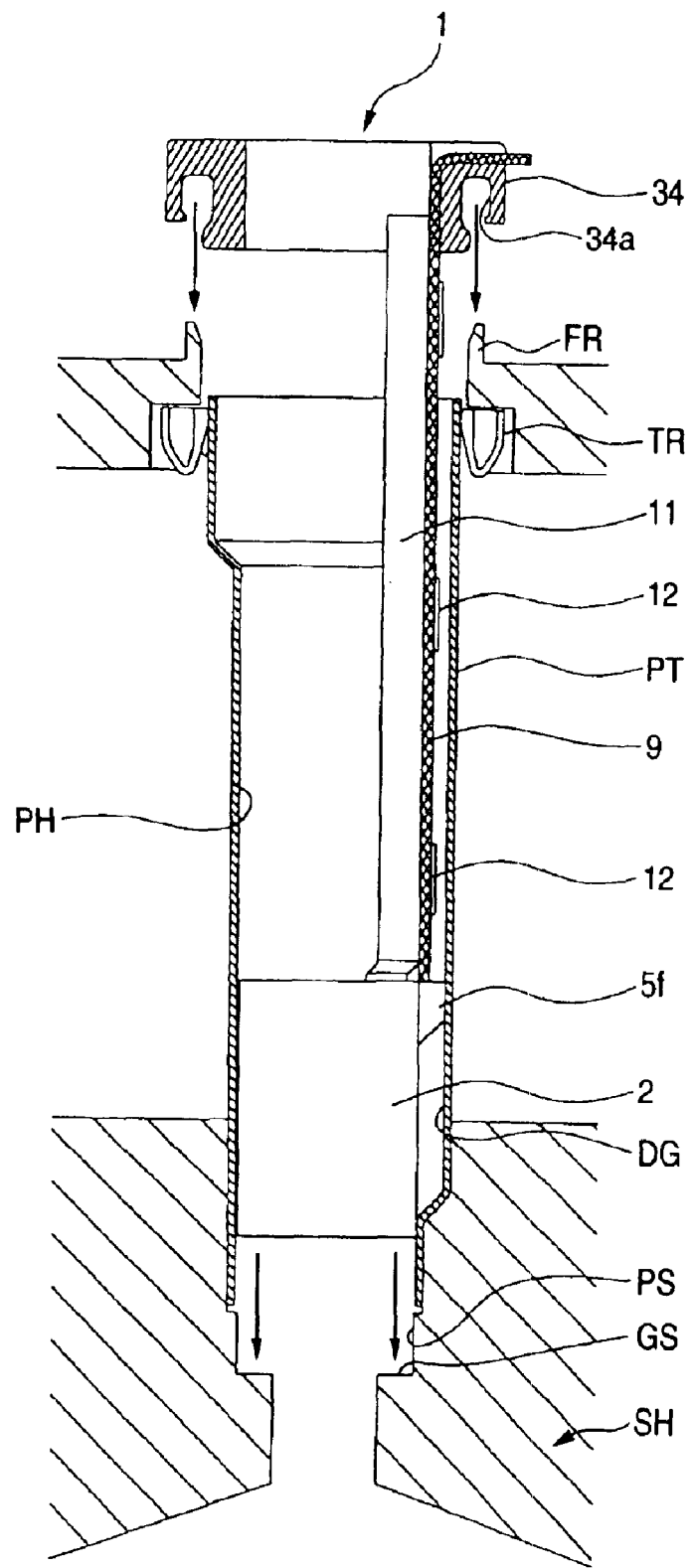
FIG. 10 is a sectional view showing the method for attaching the unit body portion to a plug hole.
Figure 11:
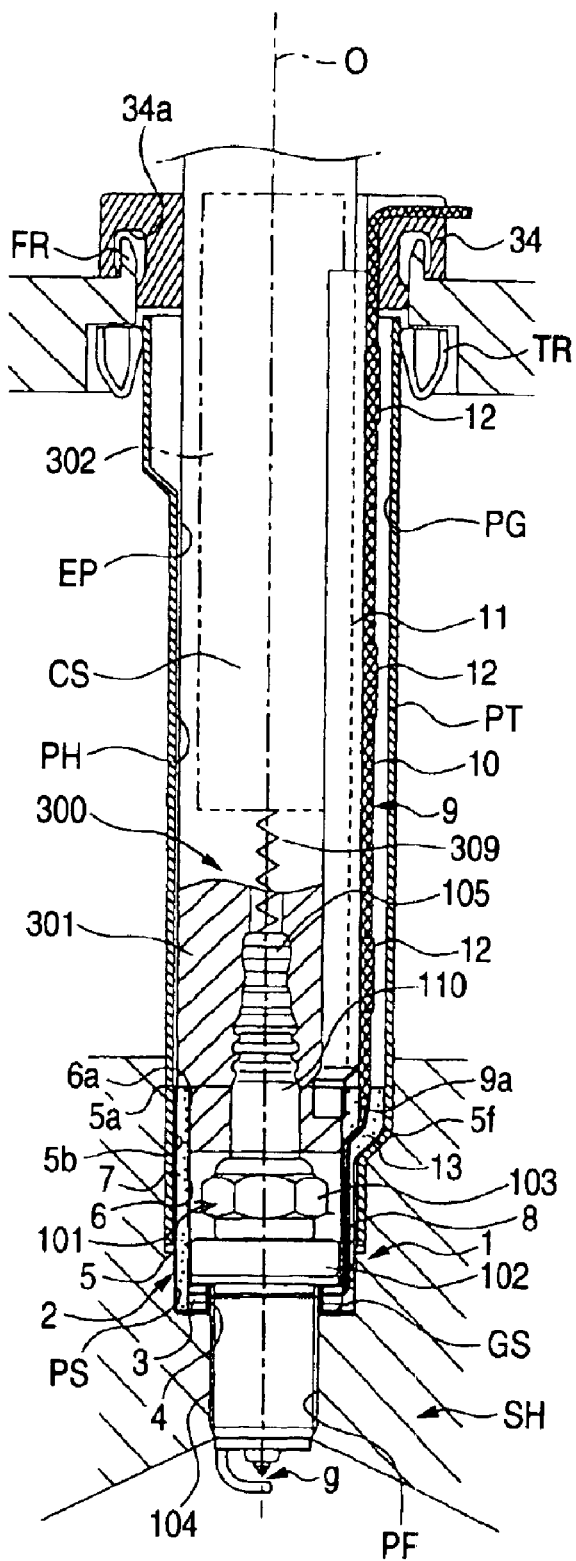
FIG. 11 is a sectional view showing the state where an ignition coil has been attached to a pressure sensor in FIG. 1.

The pressure sensor unit 1 configured thus is attached into the plug hole PH as shown in FIG. 10. Incidentally, an attachment ring 34 made of rubber is integrated with the upper end portion of the lead wire support portion 11. When a rib FR formed at the opening circumferential edge of the plug hole PH is fitted into an engagement groove 34*a* formed in the lower surface of the attachment ring 34, the upper portion side of the pressure sensor unit 1 can be fixed. Then, as shown in FIG. 1, a plug wrench PW is engaged with a hexagonal portion 103 of the metal shell 101 so that the spark plug is attached. As described above, in this state, at the rear of the standard section SS, there is no component of the pressure sensor unit 1 in the area CS inside the inner circumferential surface 5*b* of the outer cylinder member 5 or its extended plane EP. It is therefore possible to dispose a pencil-shaped ignition coil unit 300 in the plug hole PH by making full use of this area (space) CS as shown in FIG. 11. The ignition coil unit 300 has a cylindrical contour as a whole. The front end portion of the ignition coil unit 300 in the direction of the axis O is formed as a plug cap portion 301 made of rubber, and placed over a terminal metal shell 105 and the rear end portion of the insulator 110. Then, an ignition coil 302 is disposed at the rear of the plug cap portion 301 so as to supply a high voltage for ignition to the terminal metal shell 105 through a high voltage terminal portion 309.

Figure 12:
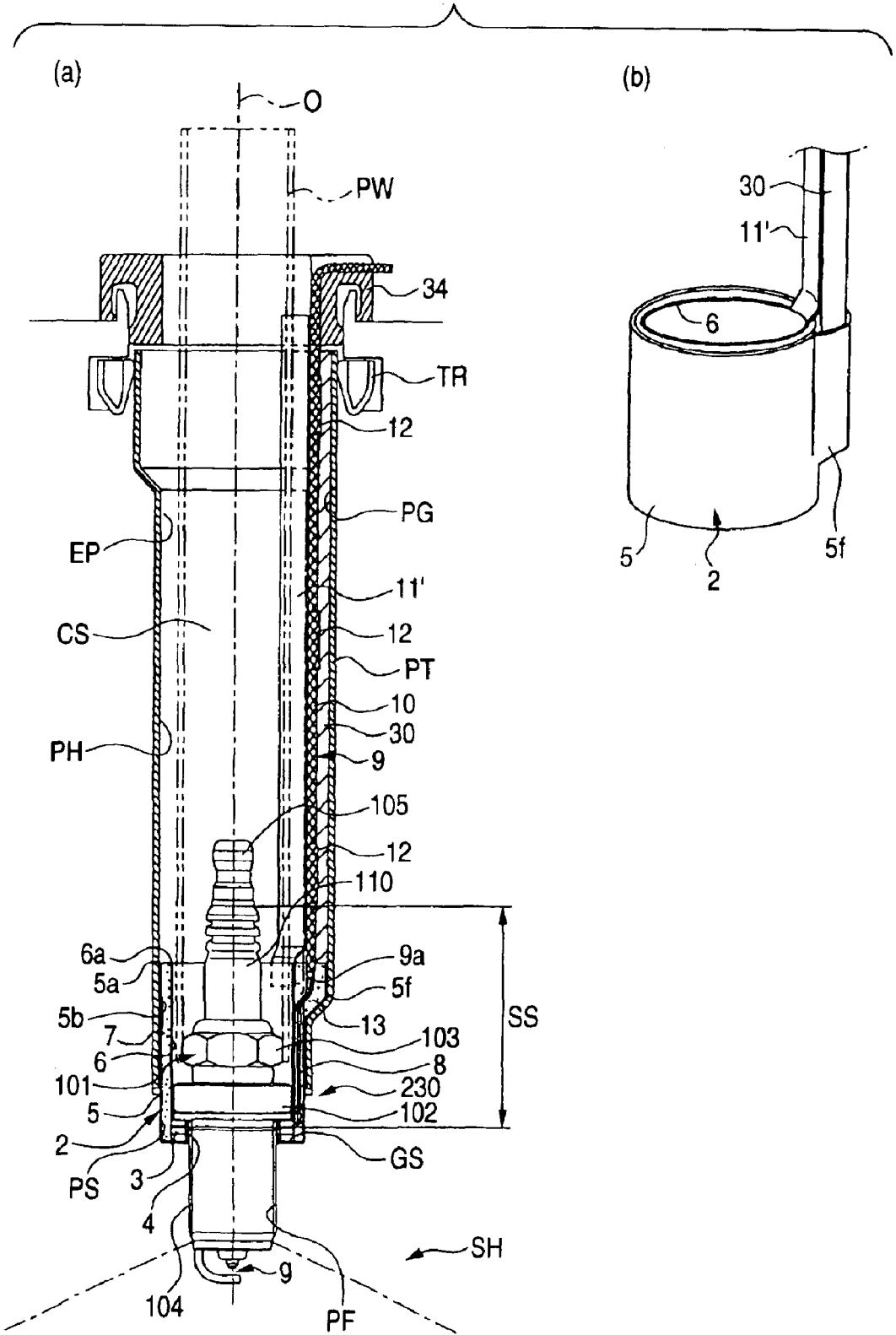
FIG. 12 is a longitudinal sectional view showing a second embodiment of the pressure sensor unit according to the present invention in the state where a spark plug has been attached, and a perspective view of a unit body thereof.

Description will be made below about various modification examples of the pressure sensor unit according to the present invention (incidentally, parts common to those in the above description are referred to as the same reference numerals and signs, and detailed description thereof will be omitted). In a pressure sensor unit 230 in FIG. 12, a lead wire support portion is designed to have a polymeric material molded portion 30 integrated with a sensor output lead wire 9. Here, the polymeric material molded portion 30 is provided together with a sheet-like portion 11' which is the same as the lead wire support portion 11 in FIG. 1, so that the polymeric material molded portion 30 extends along the sheet-like portion 11' so as to be shaped like a rod. However, the sheet-like portion 11' may be omitted.

Incidentally, although the description has been made on the case where the inside of the lead wire extracting portion 5f is formed as the polymeric material filled-up portion 13, the front end portion of the polymeric material molded portion 30 forming the lead wire support portion, and the polymeric material filled-up portion 13 may be integrally joined to each other by bonding, integral molding or the like. Thus, the bonding strength of the polymeric material molded portion 30 to the unit body 2 can be enhanced.

Figure 13:
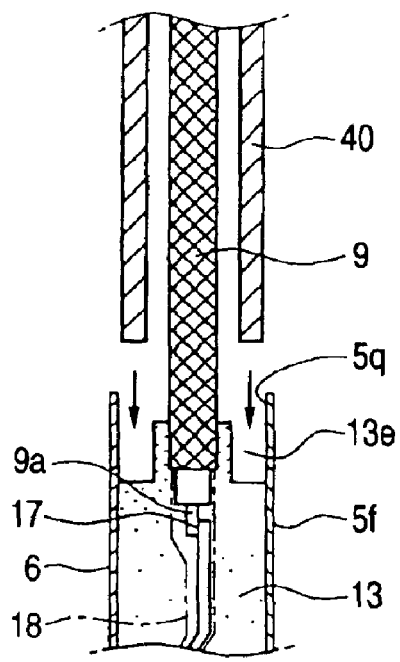
FIG. 13 is a main portion sectional view showing some embodiments in each of which the lead wire support portion is formed as a cylindrical support.
Figure 13:
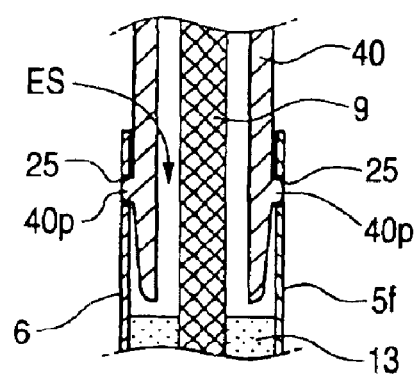
Figure 13:
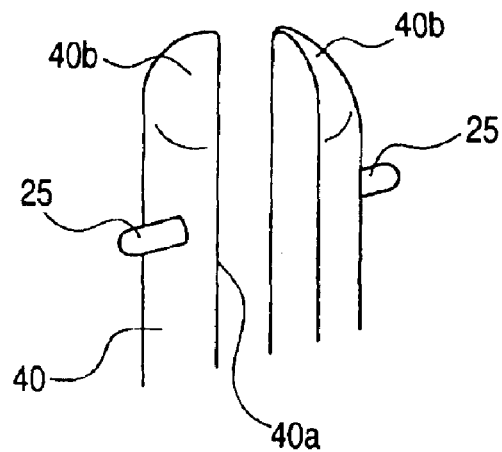

On the other hand, when the lead wire support portion is formed as a cylindrical support 40 to which the sensor output lead wire 9 will be inserted in the direction of the axis O as shown in FIG. 13, the structure of the lead wire support portion can be made simpler. The cylindrical support 40 may be made of a polymeric material such as plastic or the like, or may be formed from metal. When the cylindrical support 40 is made of metal, the cylindrical support 40 may have a function also as the shield portion of the sensor output lead wire 9, and, for example, the shield coat 10 in the cylindrical support 40 may be omitted. As for the mode in which the cylindrical support 40 is coupled with the unit body 2, for example, the front end portion of the cylindrical support 40 may be inserted and retained from a rear-end-side opening portion 5q into the lead wire extracting portion 5f formed in the outer cylinder member 5, as illustrated. In (a) of FIG. 13, the front end portion of the cylindrical support 40 is designed to be pressed into a concave portion 13e formed in the polymeric material filled-up portion 13. On the other hand, in (b) of FIG. 13, engagement convex portions 40p formed in the outer circumferential surface of the cylindrical support 40 are fitted into engagement holes (or concave portions) 25 formed in the lead wire extracting portion 5f. In this case, the front end portion of the cylindrical support 40 is pressed into an engagement space ES formed in the upper portion of the lead wire extracting portion 5f, while the engagement convex portions 40p or the support wall portions on the base end side of the engagement convex portions 40p are elastically deformed radially. Thus, the engagement convex portions 40p are elastically restored in the engagement holes 25 so that they can be interfitted. For example, when an axial slit 40a is axially formed in the front end portion of the cylindrical support 40 as shown in (c) of FIG. 13, portions 40b and 40b opposed to each other through the slit become easier to be deformed elastically in the direction in which they approach each other, so that the fitting becomes easier.

Figure 14:
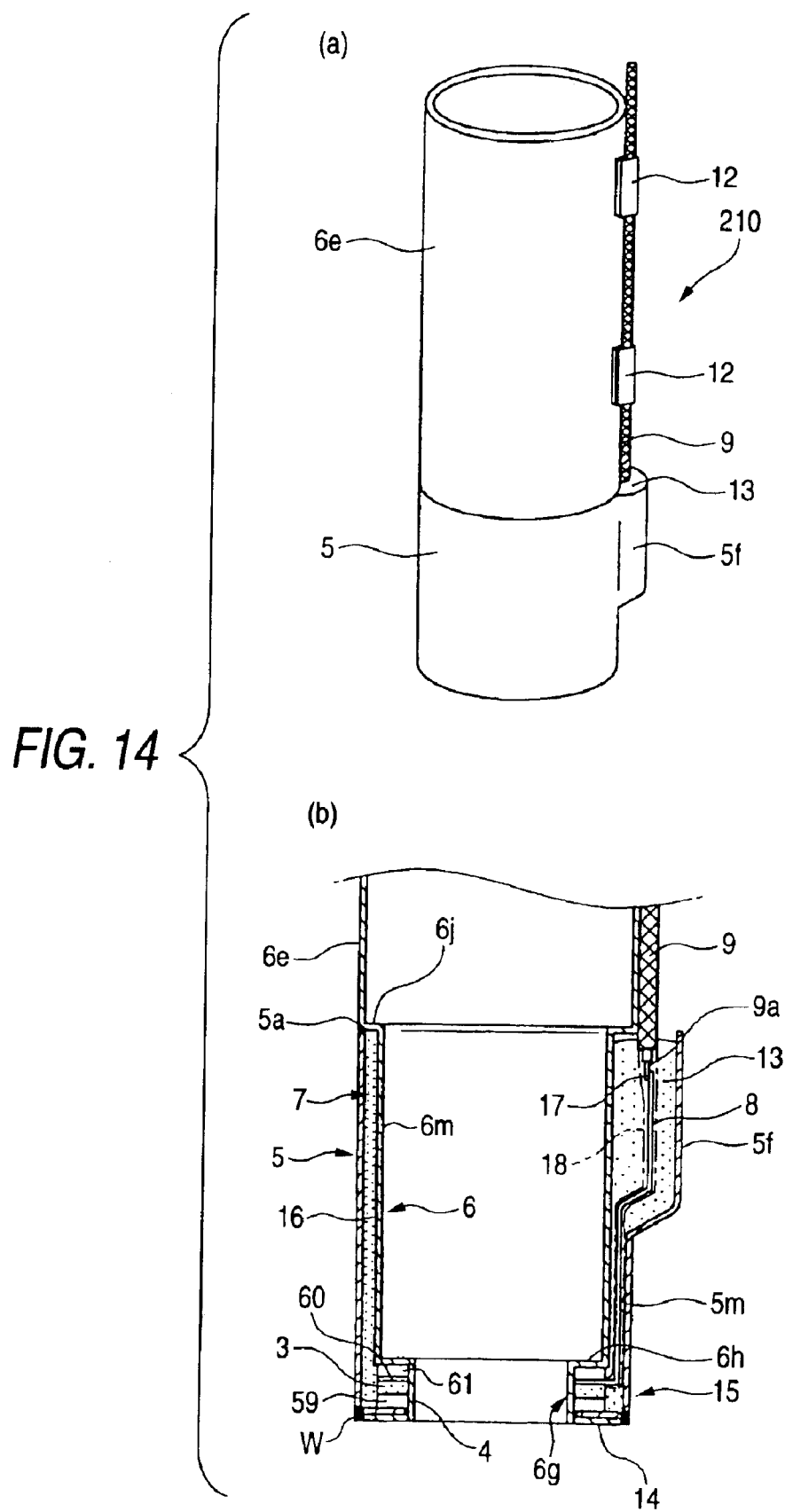
FIG. 14 is an external perspective view and a main portion longitudinal sectional view showing an embodiment in which an extension portion is formed in the inner cylinder member.

Next, although both the rear edge 6a of the inner cylinder member 6 and the rear edge 5a of the outer cylinder member 5 have been designed to be located in the standard section SS in the pressure sensor unit 1 of FIG. 1, one of them may be designed to extend toward the rear side behind the standard section SS in the direction of the axis O. A pressure sensor unit 210 in (a) of FIG. 14 shows an example in which the inner cylinder member 6 is extended. As shown in (b) of FIG. 14, the rear end 5a of the outer cylinder member 5 provides a standard position. In the inner cylinder member 6, an extension portion 6e is integrated with the rear end of the body portion 6m through a step portion 6j. The diameter of the extension portion 6e is expanded to substantially coincide with the extension of the wall portion of the outer cylinder member 5. This extension portion 6e has a function also as the lead wire support portion, which is designed so that fixation portions 12 similar to those in FIG. 5 support the sensor output lead wire 9 on their outer circumferential surface of the extension portion 6e.

Figure 15:
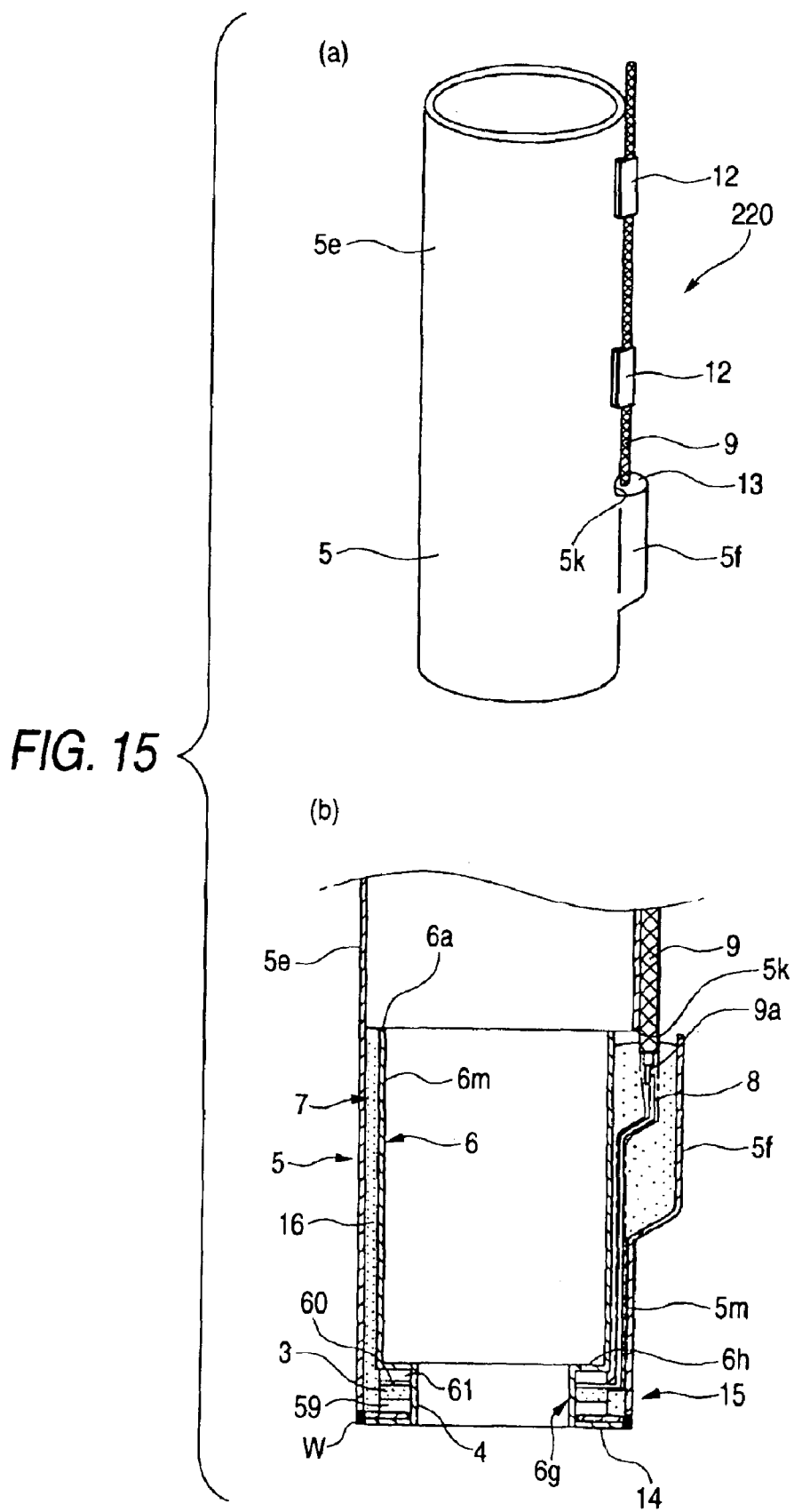
FIG. 15 is an external perspective and a main portion longitudinal sectional view showing an embodiment in which an extension portion is formed in an outer cylinder member.

On the other hand, (a) of FIG. 15 shows an example in which the outer cylinder member 5 is extended. As shown in (b) of FIG. 15, the rear end 6a of the inner cylinder member 6 provides a standard position. An extension portion 5e is formed in the outer cylinder member 5 in the form where the body portion 5m is extended without changing its diameter. Incidentally, an extraction hole 5k is formed for extracting the sensor output lead wire 9 to the outside. In this embodiment, a lead wire extracting portion 5f is formed to bulge in a position corresponding to the extraction hole 5k. Also here, the extension portion 5e is used also as the lead wire support portion, which is designed so that fixation portions 12 support the sensor output lead wire 9 on the outer circumferential surface of the extension portion 5e.

While the present invention has been described in detail and with reference to its specific embodiments, it will be obvious to those skilled in the art that various changes and modifications may be made without departing from the spirit and scope of the present invention.

This application is based on a Japanese patent application (Japanese Patent Application No. 2000-364941) filed on Nov. 30, 2000, and the contents thereof are incorporated herein for reference.

INDUSTRIAL APPLICABILITY

The present invention provides a pressure sensor unit which is formed separately from a spark plug, and in which an extra space does not have to be secured in the peripheral portion of a pressure sensing element, and a space for attaching peripheral components such as an ignition coil and the like can be secured flexibly in a spark plug hole.

What is claimed is:

1. A pressure sensor unit (1, 200, 210, 220, 230) in which a ring-like pressure sensing element (3) is incorporated in a cylindrical unit body portion (2) having a spark plug insertion hole (4) formed in a bottom surface thereof, the pressure sensing element (3) surrounding the spark plug insertion hole (4); when a side where the pressure sensing element (3) is located in a direction of an axis (O) is set as a front end side, the unit body portion (2) is inserted into and fixed to a plug hole (PH) from the front end side in the direction of the axis (O); and in that state, a spark plug (100) is inserted into the spark plug insertion hole (4) to be thereby attached to an attachment hole (PF) at a bottom of the plug hole (PH), so that the pressure sensing element (3) is nipped and retained between a sensor support portion (102) projecting like a collar from an outer circumferential surface of a metal shell (101) of the spark plug (100), and an opening circumferential edge portion (GS) of the attachment hole (PF); wherein the pressure sensing element (3) is disposed in a clearance (7) formed between an outer cylinder member (5)

forming an outer circumferential surface portion of the unit body portion (2) and an inner cylinder member (6) forming an inner circumferential surface portion likewise, and an output from the pressure sensing element (3) is extracted by a sensor output lead wire (9) via a sensor output terminal (8) led out into the clearance (7); and in a state where the spark plug (100) has been attached, a rear end of at least one of the inner cylinder member (6) and the outer cylinder member (5) in the direction of the axis (O) is located between a rear end of the pressure sensing element (3) and a rear end of an insulator (110) of the spark plug (100) (hereinafter, referred to as "in a standard section (SS)"), while at a rear of the standard section (SS), no component of the pressure sensor unit (1) exists in an area inside an inner circumferential surface (5b) of the outer cylinder member (5) or an extended plane (EP) thereof.

2. The pressure sensor unit (1, 200, 210, 220, 230) according to claim 1, wherein the outer cylinder member (5) comprises an outer cylinder body portion (5m) having a cylindrical outer circumferential surface, and the sensor output lead wire (9) connected to the sensor output terminal (8) is passed between an inner circumferential surface of the outer cylinder body portion (5m) and an outer circumferential surface of the inner cylinder member (6) in a section between a rear end surface of the pressure sensing element (3) and an extraction position (AP) at a predetermined distance on the rear side in the direction of the axis (O), while the sensor output lead wire (9) is extracted outside an outer circumferential surface (5c) of the outer cylinder body portion (5m) in a section behind the extraction position (AP).

3. The pressure sensor unit (1, 200, 210, 220, 230) according to claim 1, wherein a lead wire support portion (11, 5e, 6e, 30, 40) for supporting the sensor output lead wire (9) extending behind the standard section in the direction of the axis (O) is provided integrally with the unit body (2).

4. The pressure sensor unit (1, 210, 220) according to claim 3, wherein fixation portions (12) for fixing the sensor output lead wire (9) to the lead wire support portion (11, 5e, 6e) are provided at predetermined intervals in the direction of the axis (O) in the lead wire support portion (11, 5e, 6e).

5. The pressure sensor unit (230) according to claim 3, wherein the lead wire support portion is a cylindrical support (40) to which the sensor output lead wire (9) is inserted in the direction or the axis (O).

6. The pressure sensor unit (1, 200, 230) according to claim 1 wherein bath a rear edge (6a) of the inner cylinder member (6) and a rear edge (5a) of the outer cylinder member (5) are located in the standard section (SS).

7. The spark plug (1, 200) according to claim 6, wherein the lead wire support portion (11) has a sheet-like member disposed along the sensor output lead wire.

8. The pressure sensor unit (230) according to claim 6, wherein the lead wire support portion has a polymeric material molded portion (30) integrated with the sensor output lead wire (9).

9. The pressure sensor unit according to claim 1, wherein the inner cylinder member (6) has a bulge portion (6g) in which an end portion wall on a front end side in the direction of the axis (O) is bulged inward radially, and an inner circumferential surface of the bulge portion (6g) is formed as the spark plug insertion hole (4), while the outer cylinder member (5) and the bulge portion (6g) of the inner cylinder member (6) are integrated on the front end side in the direction of the axis (O), and a bottom closing portion (14) for closing the clearance (7) on the side is provided, while the bulge portion (5f), a wall portion (5h) of the outer cylinder member (5) opposite to the bulge portion (5f), and the bottom closing portion (14) form a sensor receiving portion (15) for receiving the pressure sensing element (3); and wherein in a state where the spark plug (100) has been attached, the pressure sensing element (3) is, together with the sensor receiving portion (15), nipped between the sensor support portion (102) and the opening circumferential edge portion (GS) of the attachment hole (PF).

10. The pressure sensor unit according to claim 1, wherein an inside of the clearance (7) is formed as a polymeric material filled-up portion (16).

11. A pressure sensor unit (1, 200, 210, 220, 230) in which a ring-like pressure sensing element (3) is incorporated in a cylindrical unit body portion (2) having a spark plug insertion hole (4) formed in a bottom surface thereof, the pressure sensing element (3) surrounding the spark plug insertion hole (4); when a side where the pressure sensing element (3) is located in a direction of an axis (O) is set as a front end side, the unit body portion (2) is inserted into and fixed to a plug hole (PH) from the front end side in the direction of the axis (O); and in that state, a spark plug (100) is inserted into the spark plug insertion hole (4) to be thereby attached to an attachment hole (PF) at a bottom of the plug hole (PH), so that the pressure sensing element (3) is nipped and retained between a sensor support portion (102) projecting like a collar from an outer circumferential surface of a metal shell (101) of the spark plug (100), and an opening circumferential edge portion (GS) of the attachment hole (PF); wherein the pressure sensing element (3) is disposed in a clearance (7) formed between an outer cylinder member (5) forming an outer circumferential surface portion of the unit body portion (2) and having an outer cylinder body portion (5m) having a cylindrical outer circumferential surface, and an inner cylinder member (6) forming an inner circumferential surface portion likewise, and an output from the pressure sensing element (3) is extracted by a sensor output lead wire (9) via a sensor output terminal (8) led out into the clearance (7); and in a state where the spark plug (100) has been attached, a rear end of at least one of the inner cylinder member (6) and the outer cylinder member (5) in the direction of the axis (O) is located between a rear end of the pressure sensing element (3) and a rear end of an insulator (110) of the spark plug (100) (hereinafter, referred to as "in a standard section (SS)"), while at a rear of the standard section (SS), a radially outer edge position of the sensor output lead wire (9) with respect to the axis (O) is located outside an inner circumferential surface position of the outer cylinder body portion (5m) in the radial direction.

12. The pressure sensor unit (1, 200, 210, 220, 230) according to claim 11, wherein the outer cylinder member (5) comprises an outer cylinder body portion (5m) having a cylindrical outer circumferential surface, and the sensor output lead wire (9) connected to the sensor output terminal (8) is passed between an inner circumferential surface of the outer cylinder body portion (5m) and an outer circumferential surface of the inner cylinder member (6) in a section between a rear end surface of the pressure sensing element (3) and an extraction position (AP) at a predetermined distance on the rear side in the direction of the axis (O), while the sensor output lead wire (9) is extracted outside an outer circumferential surface (5c) of the outer cylinder body portion (5m) in a section behind the extraction position (AP).

13. The pressure sensor unit (1, 200, 210, 220, 230) according to claim 11, wherein a lead wire support portion (11, 5e, 6e, 30, 40) for supporting the sensor output lead wire (9) extending behind the standard section in the direction of the axis (O) is provided integrally with the unit body (2).

14. The pressure sensor unit (1, 210, 220) according to claim 13, wherein fixation portions (12) for fixing the sensor output lead wire (9) to the lead wire support portion (11, 5e, 6e) are provided at predetermined intervals in the direction of the axis (O) in the lead wire support portion (11, 5e, 6e).

15. The pressure sensor unit (230) according to claim 13, wherein the lead wire support portion is a cylindrical support (40) to which the sensor output lead wire (9) is inserted in the direction of the axis (O).

16. The pressure sensor unit (1, 200, 230) according to claim 11, wherein both a rear edge (6a) of the inner cylinder member (6) and a rear edge (5a) of the outer cylinder member (5) are located in the standard section (SS).

17. The spark plug (1, 200) according to claim 16, wherein the lead wire support portion (11) has a sheet-like member disposed along the sensor output lead wire.

18. The pressure sensor unit (230) according to claim 16, wherein the lead wire support portion has a polymeric material molded portion (30) integrated with the sensor output lead wire (9).

19. The pressure sensor unit according to claim 11, wherein the inner cylinder member (6) has a bulge portion (6g) in which an end portion wall on a front end side in the direction of the axis (O) is bulged inwardly radially, and an inner circumferential surface of the bulge portion (6g) is formed as the spark plug insertion hole (4), while the outer cylinder member (5) and the bulge portion (6g) of the inner cylinder member (6) are integrated on the front end side in the direction of the axis (O), and a bottom closing portion (14) for closing the clearance (7) on the side is provided, while the bulge portion (5f), a wall portion (5h) of the outer cylinder member (5) opposite to the bulge portion (5f), and the bottom closing portion (14) form a sensor receiving portion (15) for receiving the pressure sensing element (3); and wherein in a state where the spark plug (100) hats been attached, the pressure sensing element (3) is, together with the sensor receiving portion (15), nipped between the sensor support portion (102) and the opening circumferential edge portion (GS) of the attachment hole (PF).

20. The pressure sensor unit according to claim 11, wherein an inside of the clearance (7) is formed as a polymeric material filled-up portion (16).

* * * * *